July 29, 1958     M. D. YOUNGREN     2,844,898
ANIMATED DEVICES
Filed Dec. 27, 1955     4 Sheets-Sheet 1
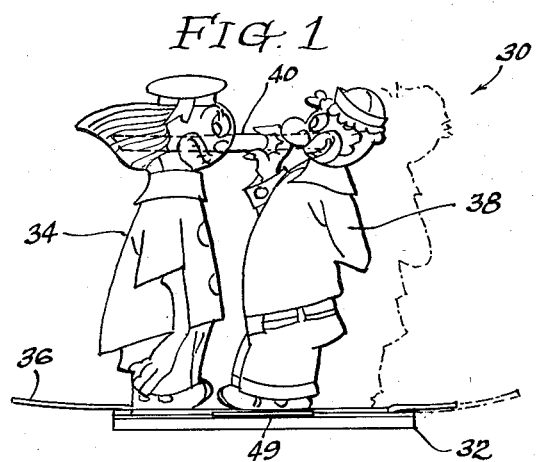
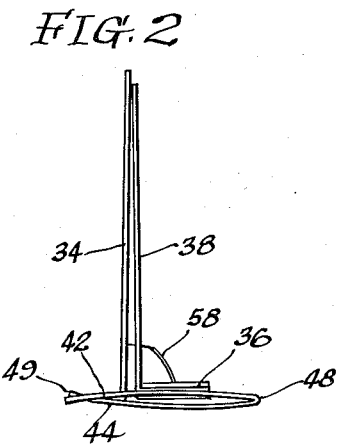
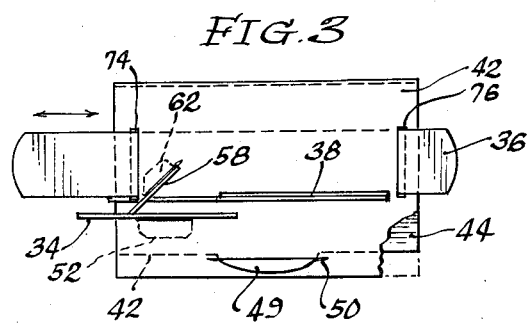
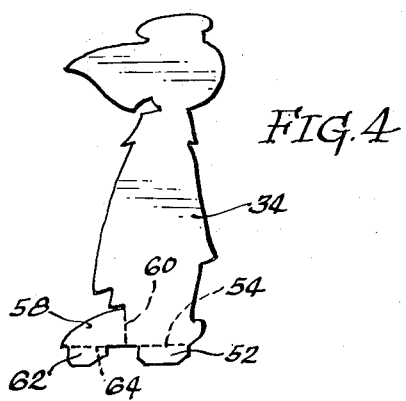
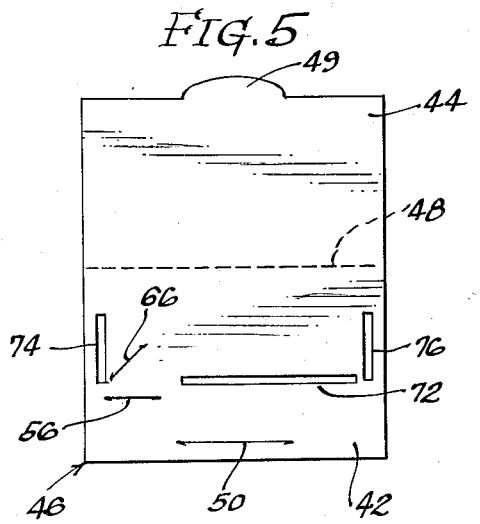
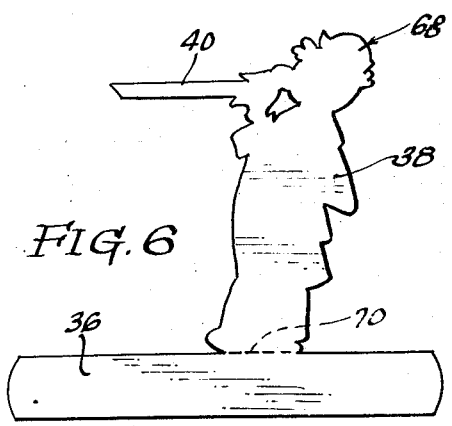
INVENTOR.
Milton D. Youngren
BY
Ooms, McDougall,
Williams & Hersh
Attorneys July 29, 1958 M. D. YOUNGREN 2,844,898
ANIMATED DEVICES
Filed Dec. 27, 1955 4 Sheets-Sheet 2
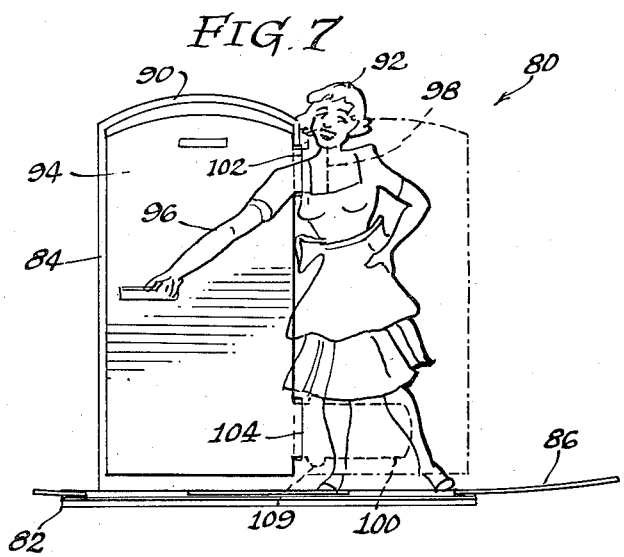
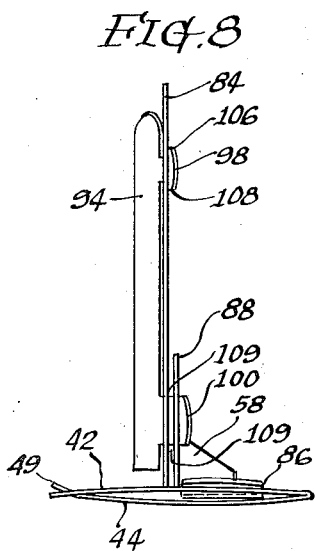
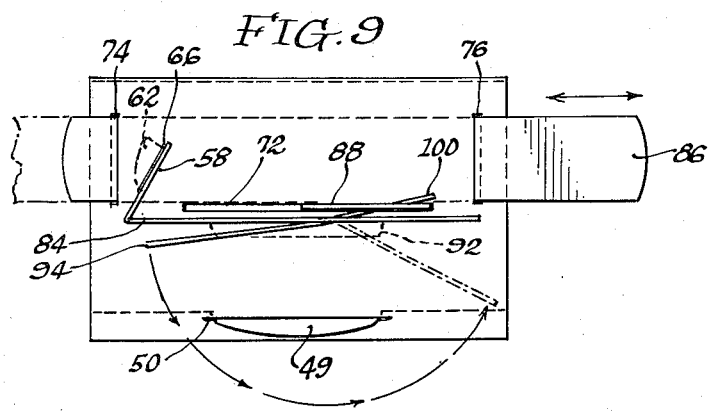
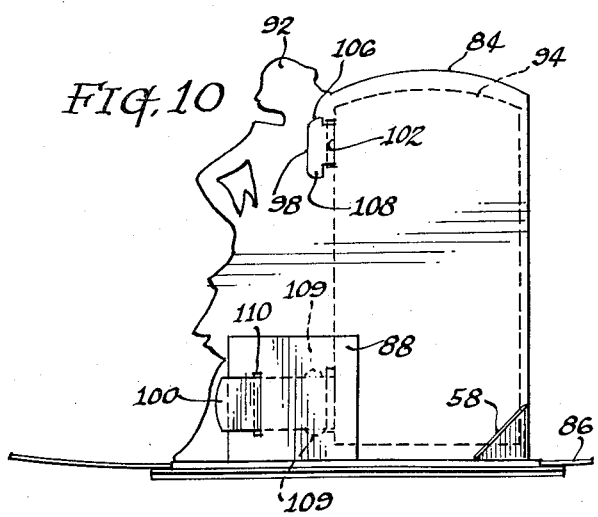
INVENTOR.
Milton D. Youngren
BY Ooms, McDougall,
Williams & Hersh
Attorneys July 29, 1958   M. D. YOUNGREN   2,844,898
ANIMATED DEVICES
Filed Dec. 27, 1955   4 Sheets-Sheet 3

INVENTOR.
Milton D. Youngren
BY Ooms, McDougall,
Williams & Hersh
Attorneys

July 29, 1958 M. D. YOUNGREN 2,844,898
ANIMATED DEVICES
Filed Dec. 27, 1955 4 Sheets-Sheet 4
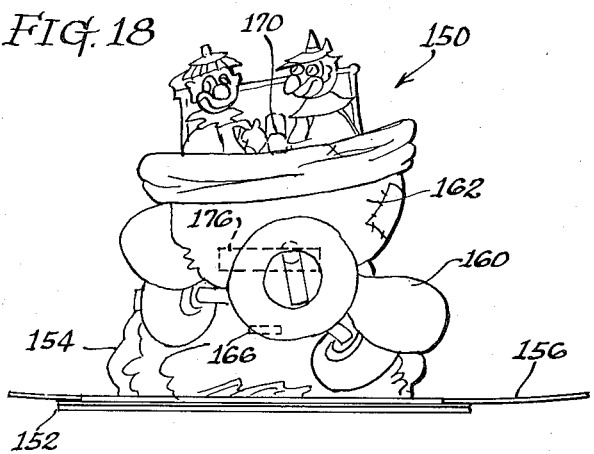
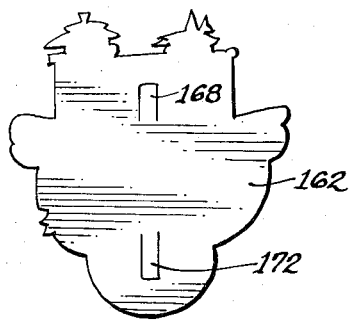
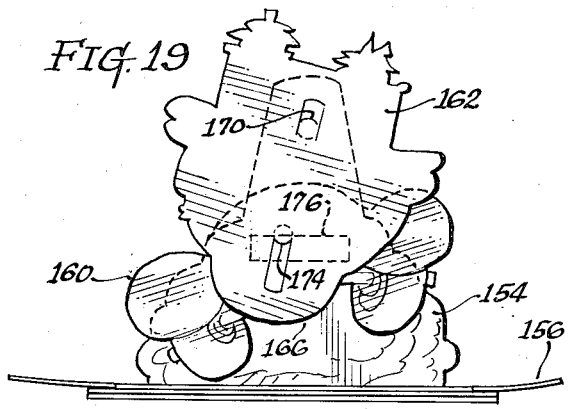
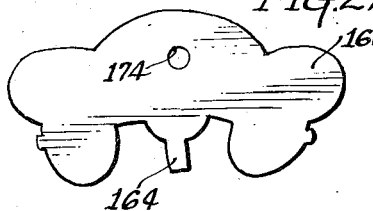
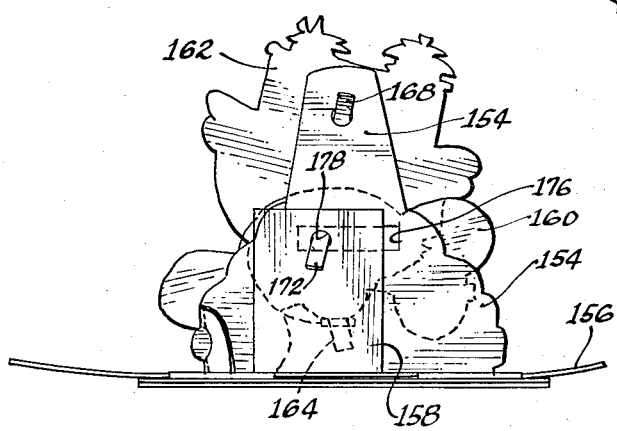
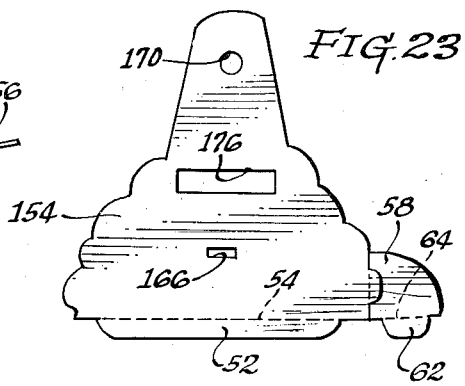
INVENTOR
Milton D. Youngren
BY
Ooms McDougall,
Williams E Hersh
Attorneys

United States Patent Office 2,844,898
Patented July 29, 1958

2,844,898

ANIMATED DEVICES

Milton D. Youngren, Glencoe, Ill.

Application December 27, 1955, Serial No. 555,589

9 Claims. (Cl. 40—126)

This invention relates to new and improved animated devices for use as greeting cards, toys, premiums, advertising and promotional items, and otherwise.

One object of the present invention is to provide new and improved animated devices adapted to be made out of card stock or other similar thin material so as to be well suited for use as greeting cards, promotional and advertising items, premiums, toys and the like.

A further object is to provide new and improved animated devices which are adapted to be made out of thin flat material and which may be shipped or distributed in a flat condition, but which may be erected into a condition in which the devices are adapted to stand alone in an upright position for use as toys, animated display devices and the like.

It is another object of the present invention to provide devices of the foregoing character which will afford a variety of animated effects so that the devices will be valued as greeting cards, toys, display items and the like.

A further object is to provide new and improved animated devices which are low in cost, simple in construction, easy to form and erect, attractive in appearance and of great interest with regard to animated operation.

Further objects and advantages of the invention will appear from the following description taken with the accompanying drawings, in which:

Figure 1 is a front elevational view of one animated device constituting an illustrative embodiment of the invention.

Fig. 2 is a right side elevational view of the device of Fig. 1.

Fig. 3 is a top view of the advice of Fig. 1.

Figs. 4, 5 and 6 are plan views of flat blanks employed in forming components of the device of Fig. 1.

Fig. 7 is a front elevational view of another animated device constituting a second illustrative embodiment of the invention.

Fig. 8 is a right side elevational view of the device of Fig. 7.

Fig. 9 is a top view of the device of Fig. 7.

Fig. 10 is a rear elevational view of the device of Fig. 7.

Fig. 18 is a front elevational view of another animated device constituting a fourth illustrative embodiment of the present invention.

Fig. 19 is a view similar to Fig. 18 but showing the device in a changed position.

Fig. 20 is a rear elevational view of the device shown in Fig. 18.

Figs. 21, 22 and 23 are flat blanks for components of the device of Fig. 18.

Figure 11:
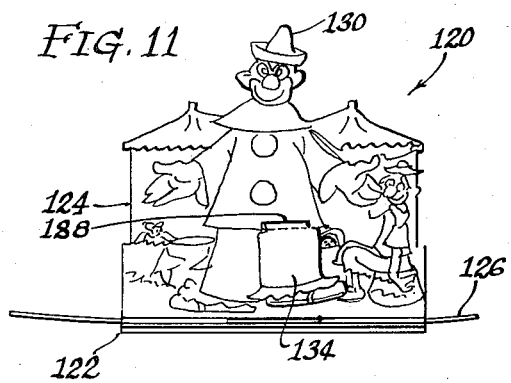
Fig. 11 is a front elevational view of another animated device constituting a third illustrative embodiment of the present invention.

The several illustrated embodiments of the present invention have a great deal in common. Thus, each of them is made of sheet material which originally is in a flat condition but is folded in various places in forming the animated device. The sheet material may be card stock, heavy paper, cardboard, various plastics, sheet metal, or any suitable material.

Each of the illustrated embodiments comprises a base for supporting the device in an upright position on a table top or other flat supporting surface. A display panel in some desired or suitable form is mounted on the base so as to stand in a generally upright position. To provide for animation, a slider or other movable member is carried by the base. Extending upwardly from the slider is a member which cooperates with the display panel to provide various animated effects. In some instances, the display panel carries a movable animating member which is adapted to be operated by the upwardly projecting element on the slider.

It will now be of interest to give more detailed consideration to the first embodiment of Figs. 1–6. This embodiment takes the form of an animated device 30 which may be used as a greeting card, toy, display item or the like. Generally, the animated device 30 comprises a base 32 adapted to support the device on any suitable horizontal surface. Extending upwardly from the base 32 is a display panel 34, which may assume various forms, but in this instance takes the form of the figure of a clown or some other humorous character. The device 30 is adapted to be animated by manipulation of a slider 36 mounted on and guided by the base 32. An upright element 38 projects upwardly from the actuating slider 36 for cooperation with the upright display element 34. In this instance, the upright actuating element 38 also constitutes a display panel, which may assume various forms but is illustrated in the form of a clown or the like.

Extending laterally from the upright figure 38 is a narrow projection 40 which cooperates with the other upright figure 34 to provide an animated effect. More specifically, the projection 40 is arranged to extend under the upper end of the figure 34 and is conformed and disposed so that it will be taken to be the nose of the clown depicted in the figure 34. Thus, moving the actuating member 36 and the upright figure 38 will give the impression that the clown of the figure 38 is pulling and stretching the nose of the clown in the figure 34.

The components of the animated device 30 may be constructed in a variety of ways. As illustrated, the base 32 is made of sheet material and is formed with a top or main panel 42 which carries the upright panel 34 and the movable actuating member 36. A lower panel 44 may also be provided on the base 32 to cover the lower side of the upper panel 42 and retain the movable actuating member 36. Preferably, the upper and lower panels 42 and 44 are formed from a single blank 46, shown in its original flat condition in Fig. 5. The blank 46 is folded along a line 48 in forming the base 32 into its erected position as shown in Figs. 1–3. The top and bottom panels 42 and 44 may be held in their erected position in various ways. Thus, in this instance, a tab 49 is formed on the bottom panel 44 and is adapted to be inserted through a slit 50 formed in the top panel 42.

The upright display panel 34 might be formed integrally with the base 32, but in this instance is formed as a distinct element, shown in its original flat condition in Fig. 4. It will be seen that a tab 52 is formed on the lower end of the panel 34 and is adapted to be folded along a horizontal line 54 for insertion through a slit 56 formed in the top panel 42 of the base 32.

In addition, a bracket or brace element 58 is formed on the panel 34 and adapted to be folded along a vertical line 60. Another tab 62 is provided on the brace 58 and is adapted to be folded along a horizontal line 64 for insertion through a diagonally extending slit 66 in the top panel 42.

The actuating member 36 and the upright actuating panel 38 may be formed in a variety of ways. However, in the illustrated embodiment of Figs. 1–6, the elements 36 and 38 are formed initially as a single flat blank 68 (Fig. 6). The actuating member 36 takes the form of an elongated bar-like member at the lower end of the blank 68. It will be seen that the actuating panel 38 is adapted to be folded upwardly along a horizontal line 70 for insertion through a longitudinal slot 72 formed in the top panel 42. The actuating member 36 might be mounted on the base 32 in various ways, but in this instance the opposite ends of the bar-like member 36 are adapted to be inserted through twin slots 74 and 76 extending transversely through the top panel 42 adjacent opposite ends thereof. The portion of the actuating slider member 36 between the slots 74 and 76 is disposed between the top and bottom panels 42 and 44, in this instance, while the end portions of the member 36 extend through the slots 74 and 76 and above the top panel 42.

Either end of the actuating member 36 may be grasped for the purpose of sliding the member through the slots 74 and 76. Such movement of the slider member 36 will move the actuating panel 38 along the longitudinal slot 72 and will produce the animated effect already described, with regard to the stretching of the nose of the figure 34 by the clown of the figure 38.

The second embodiment of the invention, as shown in Figs. 7–10 is in the form of an advertising or promotional item 80 which has a variety of applications. Thus, the animated device 80 may be used by salesmen, television announcers or the like or may be given to prospective purchasers.

The animated device 80 is in many respects very similar to the device 30 already described. Thus, the device 80 comprises a base 82 which supports an upright display panel 84. An actuating member 86 is movably mounted on the base 82 and is provided with an upright panel or element 88 disposed adjacent the upright panel 84. It will be seen that the elements 82, 84, 86 and 88 correspond in many respects to the elements 32, 34, 36 and 38 of the first embodiment already described. Insofar as details of construction of the elements 82, 84, 86 and 88 are the same as corresponding details of the elements 32, 34, 36 and 38, the same reference characters have been employed in Figs. 7–10 as in Figs. 1–6. These details are covered in the description of the first embodiment.

The second animated device 80 differs from the first device 30 in that the upright display panel 84 comprises a first portion 90 which embodies a figure in the form of a refrigerator or freezer, together with a second portion 92 showing a housewife alongside the refrigerator portion 90. Mounted on the panel 84 is a movable animating element 94 which might assume various forms but is illustrated in the form of a refrigerator door hinged with respect to the refrigerator portion 90. A representation of an arm 96 extends across the door 94 from the human figure 92 to give the impression that the housewife is about to open the door. By manipulating the actuating member 86, the door element 94 may be swung back to uncover the front of the refrigerator panel 90, which may be provided with a representation of the interior of the refrigerator.

The hinging of the animating panel 94 on the upright panel 84 may be accomplished in various ways. In the illustrated construction, the door panel 94 is provided with upper and lower tabs 98 and 100 which project horizontally from one side of the panel 94 and are adapted to extend through vertical slots 102 and 104 in the upright panel 84. It will be seen that the slots 102 and 104 provide sufficient clearance to permit free swinging movement of the tabs 98 and 100 in the slots. To prevent accidental dislodgement of the swingable panel 94 from the upright panel 84, the upper tab 98 is provided with upper and lower ears or lugs 106 and 108 adapted to be disposed behind the upright panel 84. Similar ears or lugs 109 are provided on the lower tab 100.

An operating connection might be formed in a variety of ways between the upright actuating panel 88 and the hinged animating element 94. In this instance, a vertical slot 110 is formed in the upright actuating element 88 and is adapted to receive the lower hinge tab 100, which is made of sufficient length to remain in engagement with the slot 110 throughout the range of movement of the actuating element 88. It will be apparent that movement of the actuating member 86 will result in relative shifting movement between the slots 110 and 104. Accordingly, the tab 100 will be swung from side to side, as will the door panel 94.

Figure 12:
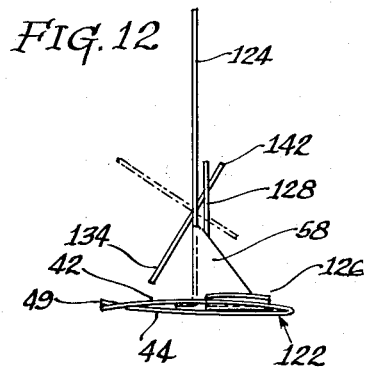
Figs. 12, 13 and 14 are right side, top, and rear views, respectively, of the device of Fig. 11.
Figure 13:
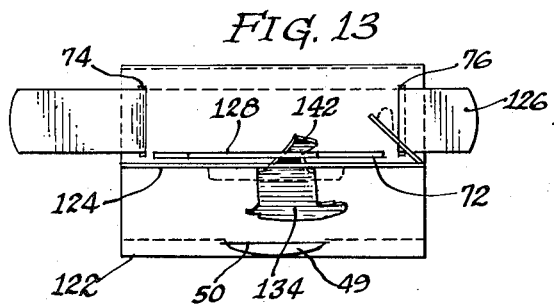
Figure 15:
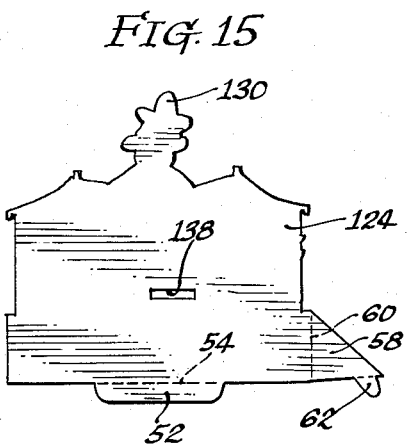
Figs. 15, 16 and 17 are plan views of flat blanks adapted to be employed in forming components of the device of Fig. 11.
Figure 14:
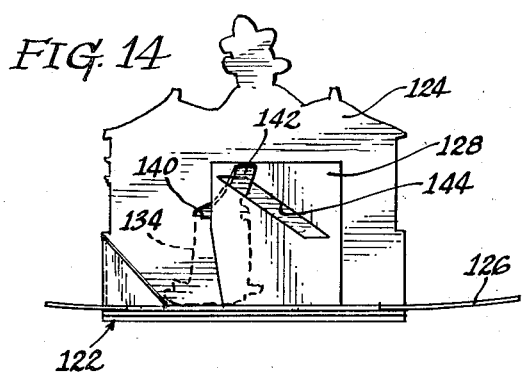
Figure 17:
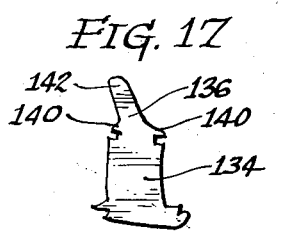
Figure 16:
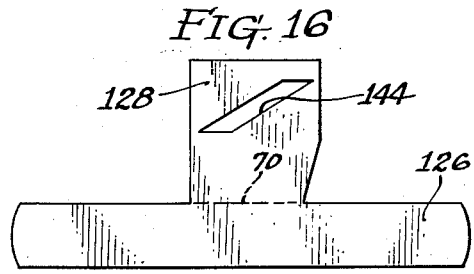

The third illustrative embodiment, shown in Figs. 11–17 has a great deal in common with the first two embodiments 30 and 80. Thus, the third embodiment takes the form of an animated device 120 having a base 122 which supports an upright display panel 124. An actuating member 126 is slidably mounted on the base 122 and is formed with an upright panel 128. The same reference characters have been used in Figs. 11–17 as in Figs. 1–6 insofar as the details of the third embodiment are the same as those of the first embodiment. These details are fully covered in the description of the first embodiment 30.

While the upright display panel 124 may be made in a variety of forms, it is arranged, in this instance, to embody the figure of a clown 130 in a circus environment. A movable animating element 134 is mounted on the upright panel 124 and is arranged, in this instance, to form one leg of the clown 130. The animating element 134 might be mounted for various types of movement. However, in this instance, the animating element 134 is hingedly mounted for upward swinging movement to give the impression that the clown is swinging his leg upwardly with a kicking movement. Such movement is imparted to the element 134 by manipulation of the actuating member 128. To provide the hinged mounting the animating element 134 is formed with an upwardly projecting tab 136 adapted to extend through a generally horizontal slot 138 formed in the display panel 124. Laterally projecting ears 140 are formed on the tab 136 and are adapted to be disposed to the rear of the panel 124 to retain the animating element 134 in the slot 138.

The operating connection between the actuating member 126 and the animating element 134 might be formed in a variety of ways. In this instance, the tab 136 is provided with an angular end portion 142 adapted to extend through an angular cam slot 144 formed in the upright actuating element 128. It will be seen that the end portion 142 angles laterally as well as upwardly and is of a width to be received comfortably in the cam slot 144. The direction of the slot 144 is generally diagonal and the disposition of the slot is such that it will sweep across the lateral position of the end portion 142 as the actuating member 126 is moved from side to side. Thus, the edges of the slot 144 swing the animating element 134 upwardly and downwardly as the actuating member 126 is manipulated. A representation of some humorous figure or legend may be displayed on the panel 124 behind the normal position of the clown's leg 134 so as to impart an additional element of humor to the lifting of the leg.

Figs. 18–23 illustrate a fourth animated device 150 having a base 152 which carries an upright panel 154 and a slidable actuating member 156. An upright element 158 is mounted on the actuating element 156. In general, the elements 152, 154, 156 and 158 correspond to the elements 32, 34, 36 and 38 of the first embodiment. The same reference characters are employed in Figs. 18-23 as in Figs. 1-6 to the extent that the details of the animated device 150 are the same as those of the first embodiment 30.

In the animated device 150, the upright display panel 154 carries two movable animating elements 160 and 162, which might be made in various forms, but in this instance are arranged to represent the lower and upper portions of an antique automobile. The elements 160 and 162 might be mounted on the panel 154 for various types of movement. However, in this instance, they are mounted for pivoting or swinging movement. Thus, the lower animating element 160 is formed with a tab 164 adapted to extend through a slot 166 in the panel 154. Likewise, a tab 168 is cut from the upper animating element 162 and is adapted to extend through an aperture 170 in the panel 154. In this instance, the aperture 170 is located above the slot 166 and in vertical alignment therewith.

To interconnect the animating elements 160 and 162 for simultaneous swinging movement, the upper element 162 is provided with a downwardly extending tab 172 adapted to pass through an aperture 174 in the lower animating element 160. In addition, the tab 172 is employed to form an operating connection with the upright actuating element 158. Thus, the tab 172 extends through a longitudinal slot 176 in the panel 154 and thence through an aperture 178 in the upright actuating element 158. Accordingly, lateral movement of the actuating element 158 shifts the tab 172 from side to side and results in swinging movement of the upper animating element 162. The lower animating element 160 is given corresponding swinging movement but in an opposite angular direction. Thus, movement of the actuating member 156 from side to side results in rocking movement of the lower and upper animating elements in opposite directions of rotation. This gives the impression that the antique automobile represented by the elements 160 and 162 is shaking and rolling violently as it travels along a bumpy road.

It will be recognized that all of the components of each animated device may be formed from flat blanks cut from sheet material. Thus, the animated devices may be made of cardboard or the like and may be shipped or distributed in flat form. For example, the components of any of the animated devices may be printed and partially die cut on a cereal package or the like for assembly by the consumer to serve as a toy or premium item. As another possibility, the devices may be mailed flat as greeting cards for erection and manipulation by the recipient. In addition, the animated devices may be employed to impart an element of animation to television commercials and salesmen's demonstrations. As toys or display items, the animated devices provide a great variety of animated effects. Nevertheless, the devices can be produced at extremely low cost.

Various other modifications, alternative constructions and equivalents may be employed without departing from the true spirit and scope of the invention as exemplified in the foregoing description and defined in the following claims:

I claim:

1. An animated display device, comprising a base member made of sheet material and having adjacent upper and lower panels, means joining said panels at opposite edges thereof, an upright display panel made of sheet material and having mounting tab means on its lower end, said upper panel having slot means disengageably receiving said mounting tab means, said upper panel having a pair of longitudinally spaced transversely extending slots therein, a slider made of sheet material and having opposite end portions extending through said slots to mount said slider on said base member for sliding movement between said upper and lower panels, said upper panel having a longitudinal slot therein, said slider having an upright portion folded upwardly therefrom and extending upwardly through said longitudinal slot for movement adjacent said upright display panel, an animating element made of sheet material and movably mounted on said upright display panel, and means forming an operating connection between said upright portion of said slider and said animating element for moving said animating element in response to movement of said slider.

2. An animated display device, comprising a base member made of sheet material and having adjacent upper and lower panels, means joining said panels at opposite edges thereof, an upright display panel made of sheet material and having mounting tab means on its lower end, said upper panel having slot means disengageably receiving said mounting tab means, said upper panel having a pair of longitudinally spaced transversely extending slots therein, a slider made of sheet material and having opposite end portions extending through said slots to mount said slider on said base for sliding movement between said upper and lower panels, said upper panel having a longitudinal slot therein, said slider having an upright portion folded upwardly therefrom and extending upwardly through said longitudinal slot for movement adjacent said upright display panel, said upright display panel having slot means therein, an animating element having tongue means extending through said slot means in said upright display panel for mounting said animating element thereon for swinging movement, said upright portion of said slider having slot means therein receiving said tongue means for swinging said animating element in response to movement of said slider.

3. An animated display device, comprising a base member made of sheet material and having adjacent upper and lower panels, means joining said panels at opposite edges thereof, an upright display panel made of sheet material and having mounting tab means on its lower end, said upper panel having slot means disengageably receiving said mounting tab means, said upper panel having a pair of longitudinally spaced transversely extending slots therein, a slider made of sheet material and having opposite end portions extending through said slots to mount said slider on said base for sliding movement between said upper and lower panels, said upper panel having a longitudinal slot therein, said slider having an upright portion folded upwardly therefrom and extending upwardly through said longitudinal slot for movement adjacent said upright display panel, said upright display panel having a vertical slot therein, an animating element made of sheet material and having a flat tongue hingedly received in said slot in said upright display panel to mount said animating element thereon for hinged swinging movement about a generally vertical axis, said upright portion of said slider having a generally vertical slot receiving said tongue to swing said animating element in response to movement of said slider.

4. An animated display device, comprising a base member made of sheet material and having adjacent upper and lower panels, means joining said panels at opposite edges thereof, an upright display panel made of sheet material and having mounting tab means on its lower end, said upper panel having slot means disengageably receiving said mounting tab means, said upper panel having a pair of longitudinally spaced transversely extending slots therein, a slider made of sheet material and having opposite end portions extending through said slots to mount said slider on said base for sliding movement between said upper and lower panels, said upper panel having a longitudinal slot therein, said slider having an upright portion folded upwardly therefrom and extending upwardly through said longitudinal slot for movement adjacent said upright display panel, said upright display panel having a slot therein, an animating element made of sheet material and having a flat tongue hingedly received in said slot in said upright display panel to mount said animating element thereon for hinged swinging movement, said upright portion of said slider having an inclined cam slot receiving said tongue to swing said animating element in response to movement of said slider.

5. In an animated device, the combination comprising a base panel, an upright panel fixed on said base panel, said upright panel having a generally horizontal slot therein, a vertically swingable animating member having a hinge tab extending through said slot to mount said animating member on said upright panel, an actuating member mounted for horizontal sliding movement on said base panel, an upright actuating element mounted on said actuating member and having a generally diagonal cam slot therein receiving said tab for swinging said animating member vertically in response to horizontal movement of said actuating member.

6. An animated display device, comprising a base member made of sheet material and having adjacent upper and lower panels, means joining said panels at opposite edges thereof, an upright display panel made of sheet material and having mounting tab means on its lower end, said upper panel having slot means disengageably receiving said mounting tab means, said upper panel having a pair of longitudinally spaced transversely extending slots therein, a slider made of sheet material and having opposite end portions extending through said slots to mount said slider on said base for sliding movement between said upper and lower panels, said upper panel having a longitudinal slot therein, and an upright portion folded upwardly from said slider and extending upwardly through said longitudinal slot for animating movement adjacent said upright display panel.

7. An animated display device, comprising a base member made of sheet material and having adjacent upper and lower panels, means joining said panels at opposite edges thereof, an upright display panel made of sheet material and fixed on said base member, said upper panel having a pair of longitudinally spaced transversely extending slots therein, a slider made of sheet material and having opposite end portions extending through said slots to mount said slider on said base member for sliding movement between said upper and lower panels, said upper panel having a longitudinal slot therein, said slider having an upright portion folded upwardly therefrom and extending upwardly through said longitudinal slot for movement adjacent said upright display panel, an animating element made of sheet material and movably mounted on said upright display panel, and means forming an operating connection between said upright portion of said slider and said animating element for moving said animating element in response to movement of said slider.

8. An animated display device, comprising a base member made of sheet material and having adjacent upper and lower panels, means joining said panels at opposite edges thereof, an upright display panel made of sheet material and fixed on said base member, said upper panel having a pair of longitudinally spaced transversely extending slots therein, a slider made of sheet material and having opposite end portions extending through said slots to mount said slider on said base for sliding movement between said upper and lower panels, said upper panel having a longitudinal slot therein, said slider having an upright portion folded upwardly therefrom and extending upwardly through said longitudinal slot for movement adjacent said upright display panel, said upright display panel having slot means therein, an animating element having tongue means extending through said slot means in said upright display panel for mounting said animating element thereon for swinging movement, said upright portion of said slider having slot means therein receiving said tongue means for swinging said animating element in response to movement of said slider.

9. An animated display device, comprising a base member made of sheet material and having adjacent upper and lower panels, means joining said panels at opposite edges thereof, an upright display panel made of sheet material and mounted on said base, said upper panel having a pair of longitudinally spaced transversely extending slots therein, a slider made of sheet material and having opposite end portions extending through said slots to mount said slider on said base for sliding movement between said upper and lower panels, said upper panel having a longitudinal slot therein, and an upright portion folded upwardly from said slider and extending upwardly through said longitudinal slot for animating movement adjacent said upright display panel.

References Cited in the file of this patent

UNITED STATES PATENTS

| | | |
|---|---|---|
| 1,124,639 | Mott | Jan. 12, 1915 |
| 1,818,799 | Haas | Aug. 11, 1931 |
| 2,384,662 | Wehr | Sept. 11, 1945 |
| 2,432,318 | Leech | Dec. 9, 1947 |
| 2,623,325 | Gibelli | Dec. 30, 1952 |
| 2,680,328 | Youngren | June 8, 1954 |